US012786233B2

(12) United States Patent
Candelore

(10) Patent No.: US 12,786,233 B2
(45) Date of Patent: Nov. 3, 2026

(54) PHISHING AVOIDANCE ASSISTANCE

(71) Applicant: Sony Group Corporation, Tokyo (JP)

(72) Inventor: Brant L. Candelore, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 10 days.

(21) Appl. No.: 18/886,742

(22) Filed: Sep. 16, 2024

(65) Prior Publication Data

US 2026/0081952 A1 Mar. 19, 2026

(51) Int. Cl.
*H04L 9/40* (2022.01)
*G06F 40/205* (2020.01)

(52) U.S. Cl.
CPC ........ *H04L 63/1483* (2013.01); *G06F 40/205* (2020.01)

(58) Field of Classification Search
None
See application file for complete search history.

(56) References Cited

U.S. PATENT DOCUMENTS 7,668,921 B2 * 2/2010 Proux ................. H04L 63/1416 709/224
8,601,064 B1 * 12/2013 Liao ...................... H04L 51/212 709/206
11,019,079 B2 * 5/2021 Goutal ................ H04L 63/1483
11,392,691 B1 * 7/2022 Wright .................. H04L 63/145
11,677,783 B2 * 6/2023 Lesperance ............. H04L 51/42 726/22
2004/0172429 A1 9/2004 Goguen
2004/0193684 A1 * 9/2004 Ben-Yoseph ........... H04L 67/54 709/204
2006/0095524 A1 * 5/2006 Kay ...................... H04L 51/212 709/206

(Continued)

FOREIGN PATENT DOCUMENTS

CN 101667979 B 3/2010

OTHER PUBLICATIONS

Karim et al. A Comprehensive Survey for Intelligent Spam Email Detection, IEEE Access, vol. 7 2019, pp. 168261-168295.*

(Continued)

*Primary Examiner* — Jeffrey R Swearingen
(74) *Attorney, Agent, or Firm* — John L. Rogitz; John M. Rogitz

(57) ABSTRACT

In one aspect, an apparatus may include a processor system and storage accessible to the processor system. The storage may include instructions executable by the processor system to access an email received at a recipient email account and to parse data related to the email. Based on the parsing of the data, the instructions may be executable to determine whether to take at least one action to help avoid a potential phishing instance based on bogus or look-alike email addresses. Based on a determination to take at least one action to help avoid the potential phishing instance, the instructions may be executable to take at least a first action to help avoid the potential phishing instance. Thus, various techniques may be implemented to help avoid phishing attempts from email addresses that would look legitimate to an unsuspecting user, helping to prevent fraud, cybertheft, and other malicious phishing outcomes.

20 Claims, 3 Drawing Sheets

(56) References Cited

U.S. PATENT DOCUMENTS

| | | | | |
|---|---|---|---|---|
| 2010/0306845 | A1* | 12/2010 | Vaithilingam | H04L 51/212 709/206 |
| 2015/0067833 | A1* | 3/2015 | Verma | H04L 63/1483 726/22 |
| 2015/0287336 | A1* | 10/2015 | Scheeres | G09B 5/02 434/156 |
| 2017/0026389 | A1* | 1/2017 | Gatti | H04L 63/1483 |
| 2021/0203691 | A1* | 7/2021 | Pratt | H04L 63/1416 |
| 2022/0131821 | A1* | 4/2022 | Habal | H04L 51/42 |
| 2022/0215384 | A1* | 7/2022 | Livingston | G06Q 20/3829 |
| 2024/0015185 | A1* | 1/2024 | Cross | H04L 63/20 |
| 2024/0106835 | A1* | 3/2024 | Greevy | H04L 63/126 |
| 2024/0242525 | A1* | 7/2024 | Lewis | G06V 10/82 |
| 2024/0338576 | A1* | 10/2024 | Radon | H04L 41/16 |
| 2024/0356968 | A1* | 10/2024 | Sinks | H04L 41/16 |
| 2025/0337771 | A1* | 10/2025 | Mantin | H04L 63/1483 |

OTHER PUBLICATIONS

Matching "camelCase" to a regular expression in java, StackOverflow post, edited May 29, 2014.*

Goyvaerts et al., Regular Expressions Cookbook, 2nd edition, O'Reilly Media, 2012.*

Firake, S.M., Soni, P., Meshram, B.B. (2011). Tool for Prevention and Detection of Phishing E-Mail Attacks. In: Wyld, D.C., Wozniak, M., Chaki, N., Meghanathan, N., Nagamalai, D. (eds) Advances in Network Security and Application. CNSA 2011. Communications in Computer and Information Science, vol. 196. Springer, Berlin, Heidelberg. https://doi.org/10.1007/978-3-642-22540-6_8.

Al Lawati, Maitham. What Is a DMARC Policy? None, Quarantine, and Reject. PowerDMARC, Nov. 27, 2025, powerdmarc.com/what-is-dmarc-policy/.

Al Lawati, Maitham. What Is DMARC? How It Works, Policies & Configuration Tips. PowerDMARC, Nov. 28, 2025, powerdmarc.com/what-is-dmarc/.

Firstlogic: Data Quality. Delivered. firstlogic.com/. Accessed Dec. 17, 2025.

GoDaddy Whois: Búsqueda de dominio WHOIS. GoDaddy, godaddy.com/whois. Accessed Dec. 17, 2025.

Hunter. hunter.io/. Accessed Dec. 17, 2025.

If DMARC Is So Great, Why Isn't Everyone Doing It? Valimail, valimail.com/blog/if-dmarc-is-so-great-why-isn't-everyone-doing-it/. Accessed Dec. 17, 2025.

VerifyEmailAddress.org: Free Email Verifier and Email Checker. verifyemailaddress.org/. Accessed Dec. 17, 2025.

What Is an Impersonation Attack? PowerDMARC, powerdmarc.com/what-is-an-impersonation-attack/. Accessed Dec. 17, 2025.

Whois.com—Domain Names & Identity for Everyone. whois.com/. Accessed Dec. 17, 2025.

Withheld for Privacy. withheldforprivacy.com/. Accessed Dec. 17, 2025.

ZeroBounce: Email Validation Tools & Email List Cleaning. zerobounce.net/. Accessed Dec. 17, 2025.

* cited by examiner

PHISHING AVOIDANCE ASSISTANCE

FIELD

The disclosure below relates to technically inventive, non-routine solutions that are necessarily rooted in computer technology and that produce concrete technical improvements. More particularly, this disclosure relates to assistance for avoiding potential instances of phishing.

BACKGROUND

As recognized herein, human vision and perceptibility alone are not sufficient to detect many instances of email phishing. The email system is expecting the end user to scrutinize the email address of the sender as a main line of defense. However, phishers have gotten incredibly sophisticated in email address formatting to the point where fraudulent email addresses cannot be distinguished from legitimate email addresses.

An email address usually consists of two main parts—a username and a domain name. Either can be bogus. Tools such as Sender Policy Framework (SPF), Domain Key Identified Mail (DKIM), and Domain-based Message Authentication Reporting & Conformance (DMARC) are used to check to see if the domain that is listed in the "send" or "via" field actually encrypted the message, and that the message was not altered in transit. These tools are not able to protect against lookalike usernames or domains which could be configured to pass all these checks. And it assumes that servers utilize the tools. According to SPF-All.com, 80% of the 140 million sites they checked, did not use it. And 60% that did were not set-up correctly. And the same goes for the other tools DKIM and DMRAC. And software may not report an issue to the email client even if an issue is found.

As also recognized herein, individual domain names can be blacklisted, but this technique does not prevent new domain names from being registered and used for nefarious purposes before a benign entity catches on and updates the blacklist to include the new domain name.

What's more, present principles recognize that there may be instances where a nefarious actor gains admin privileges to a legitimate email domain in order to create a bogus username with the same domain for phishing purposes. So here, someone might be able to phish using a whitelisted domain name and the user receiving the email would have little to no reason to distrust the email.

There are currently no adequate solutions to the foregoing computer-related, technological problems.

SUMMARY

Accordingly, in one aspect an apparatus includes a processor system and storage accessible to the processor system. The storage includes instructions executable by the processor system to access an email received at a recipient email account and to parse data related to the email. Based on the parsing of the data, the instructions are executable to determine whether to take at least one action to help avoid a potential phishing instance. Based on a determination to take at least one action to help avoid the potential phishing instance, the instructions are executable to take at least a first action to help avoid the potential phishing instance.

In some example implementations, the first action may include sequestering the email into a folder different from an inbox of the recipient email account. Additionally or alternatively, the first action may include presenting a notification regarding the potential phishing instance.

In various example embodiments, the determination whether to take at least one action to help avoid a potential phishing instance may be based on whether an email address from which the email was sent includes a numeric character between two alphabetic characters.

Additionally or alternatively, the determination whether to take at least one action to help avoid a potential phishing instance may be based on whether an email address from which the email was sent includes a numeric character at a first location in a string including two or more alphabetic characters. For instance, the first location may be a location other than one or more end locations of a username of the email address, where the one or more end locations may include respective numeric characters that follow all alphabetical characters of the username. In one particular implementation, the first location may be a domain name location. Or in other examples, the first location may be an end location of a username of the email address, with the end location corresponding to a last character of the username.

As yet another example that may be used alone or in combination with the ones above, the determination whether to take at least one action to help avoid a potential phishing instance may be based on whether an email address from which the email was sent includes an uppercase letter between two lowercase letters. The determination whether to take at least one action to help avoid a potential phishing instance may also be based on whether an email address from which the email was sent includes a lowercase letter between two uppercase letters.

As yet another example, the determination whether to take at least one action to help avoid a potential phishing instance may be based on whether an email address from which the email was sent includes characters from two different scripts. For example, a first script of the two different scripts may be the Latin script, and a second script of the two different scripts may be the Cyrillic script.

Still further, in some instances the determination whether to take at least one action to help avoid a potential phishing instance may be based on whether an email address from which the email was sent includes a non-alphanumeric character, such as a non-alphanumeric character between two alphanumeric characters.

In another aspect, a method includes accessing an email received at a recipient email account and parsing data related to the email. Based on the parsing of the data, the method includes determining whether to take at least one action to help avoid a potential phishing instance. Based on determining to take at least one action to help avoid the potential phishing instance, the method then includes taking at least a first action to help avoid the potential phishing instance.

In various example instances, the determining may be based at least in part on whether an email address from which the email was sent includes a numeric character between two alphabetic characters. Additionally, according to these examples, the determining may also be based on whether the email address is associated with a sent email from the recipient email account to the email address and/or whether the email address is indicated in a contacts list associated with the recipient email account.

In still another aspect, at least one computer readable storage medium (CRSM) that is not a transitory signal includes instructions executable by a processor system. The instructions are executable to access an electronic message received at a recipient electronic message account, and to analyze data related to the electronic message. Based on the analyzing of the data, the instructions are executable to determine whether to take at least one action to help avoid a potential phishing instance. Based on a determination to take at least one action to help avoid the potential phishing instance, the instructions are executable to take at least a first action to help avoid the potential phishing instance.

In some example embodiments, the instructions may be executable to validate a domain name associated with the electronic message to determine whether to take at least one action to help avoid a potential phishing instance. Here, the validation may include validating that the domain name has a natural person listed in a domain name registry as a point of contact, and/or determining that contact information such as phone number and/or physical street address are included in the registration information. Additionally or alternatively, the validation may include validating that a service through which the domain name was registered has itself not been blacklisted. The instructions may then be executable to, responsive to the domain name not being validated, determine to take at least one action to help avoid a potential phishing instance.

The details of the present application, both as to its structure and operation, can best be understood in reference to the accompanying drawings, in which like reference numerals refer to like parts, and in which:

DETAILED DESCRIPTION

Figure 1:
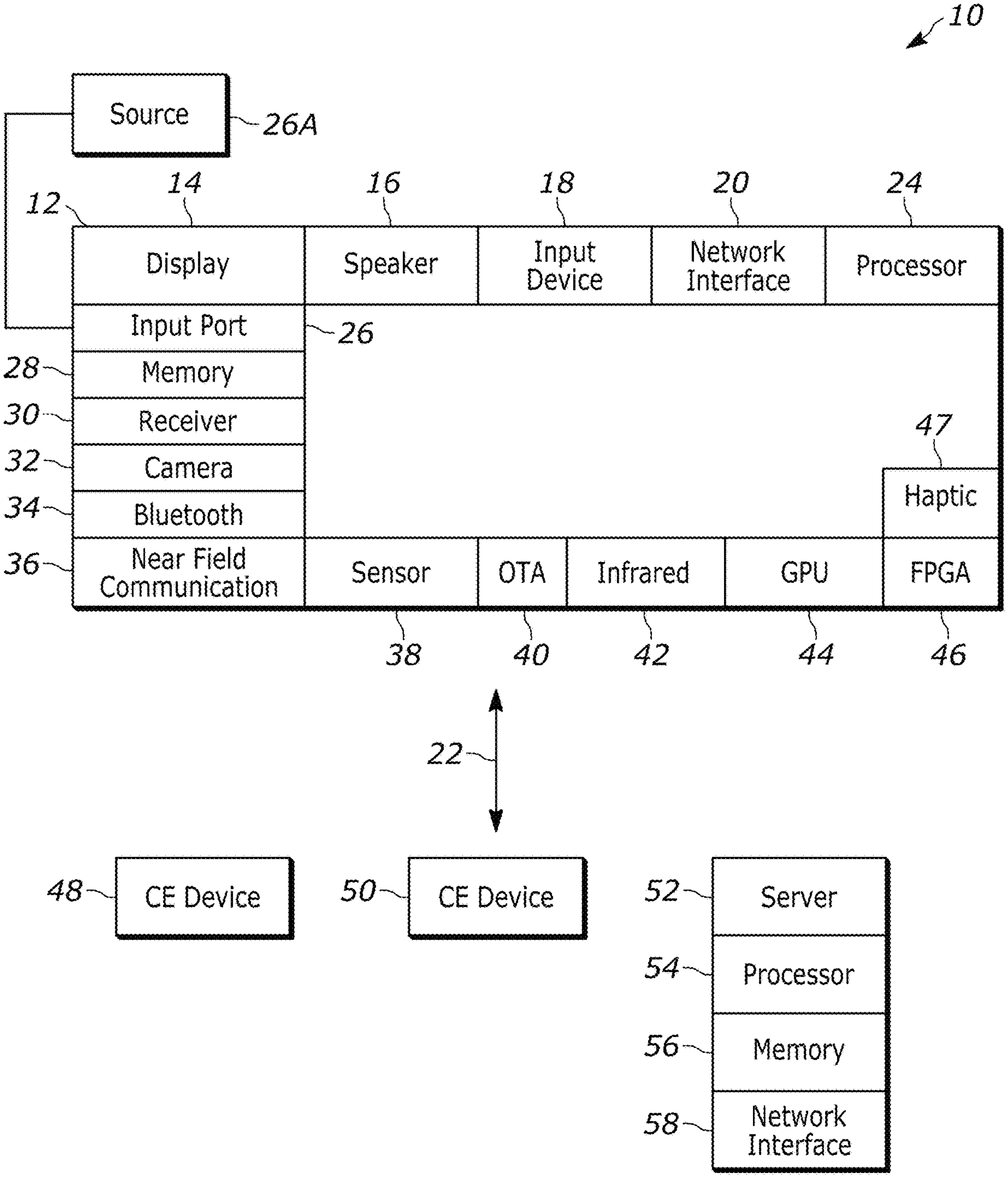
FIG. 1 is a block diagram of an example computing system consistent with present principles.

Among other things, disclosed below are email anti-phishing/spoofing techniques for use in various methods and apparatuses consistent with present principles to help to avoid instances of digital hacking by nefarious third parties.

Accordingly, present principles deal with a receiving email system or individual email client inspecting received email to then sequestrate a given email and/or alert the human receiver of a possible problem. The inspection may look at the email domain and/or the email username/ID. For example, the inspections may look for aliasing with the use of zero, "0", and check the email address for capital o, "O". The inspections can look at capital i, "I", and check the email address for lowercase l, "l". Punctuation may be looked at as well, e.g., "-", "_", and ".". Present principles recognize that these are characters that hackers can use for phishing (e.g., using look-alike email addresses).

Thus, in one example an email address may be compared to the user's contact list or recent email senders list to determine if it is legitimate. In addition, the inspection may look at various aliases for an ID and domain of an email address. For example, John.Smith@email.com, John_Smith@email.com, John-Smith@email.com are NOT the same as JohnSmith@email.com. The names and domains can therefore be compared to the user's contact list and recent emails list to see if there is a match to a previously-saved email address. This in turn may help prevent fraud perpetrated by or at least facilitated through email.

Thus, in one particular example, an algorithm consistent with present principles for checking email for potential phishing attacks may include the following steps.

If a username has a capital i, e.g. "I", then the system can check if the letter when replaced with an l, e.g. "l" or "L", matches a username/domain from recent emails or someone in the contact list. If it does, the system can raise a phishing alert, e.g. issue to the user.

The system can then do the same for zero, e.g. "0", to see if it matches an existing email address in the user's email system when the zero is replaced with the letter "o" or "O".

The system can do something similar for a two-letter combo "r" with n" for replacement with "m", since "rn" together might look like an "m" and hence the system can check to see if an email address with a replacement "m" returns a match to a previously-sent email or contacts list entry. If it does, the email may be flagged as phishing since it is not the same as the actual email address already in the user's account.

The system can do the same for "1" (one) vs. "l" (letter L), e.g. "paypa1.com" vs. "paypal.com". Some usernames have numbers to make them unique, so John5491@email.com might be confused for John549l@email.com (with an "L" at the end instead of a "1"). Also, "John" with certain numbers in the username might be flagged against John with other numbers in the username as indicated in a contacts list/sent mail. Sent mail might be checked in addition to or in lieu of a contacts list because certain people that the user has emailed might not yet be in the user's contacts list, for example.

The system can then perform similar tasks for inserted words, e.g. paypal.com vs. paypalsupport.com. So the system can be on the lookout for predetermined words that are typically added by phishers, such as "support", "help", etc., and then flag any email address as potentially phishing based on including a predefined suspect word in the username or domain name.

What's more, the system can inspect the potential dropping/omission of letters, like in www.facebok.com instead of www.facebook.com, www.youtub.com instead of www.youtube.com, etc.

Dashes "-", underscores "_" and periods "." can also resolve to different usernames/domains in some instances. So as part of the check by the system, if an incoming email has any of those characters, then the system can delete the characters themselves from the email address and see if the resulting email address matches a username/domain from recent emails or someone in the contact list, recent email folder, or from a well-known company, like Paypal, (and in such as case, determine that the email with additional non-alphanumeric character in the email address is a phishing attempt). The system can also do the reverse—if a recent sent email or legitimate contact has a non-alphanumeric character in the username, then the system can delete the character and see if it matches the incoming email username/domain (and in such as case, determine that the incoming email without the non-alphanumeric character in the email address is a phishing attempt). Also, a dash "-" might be substituted for an underscore "_" by a phisher, which can also be flagged as a potential phishing attempt based on a replacement of one with the other to do a similar check against previously-sent emails and entries in the user's digital contact list.

Thus, phishing attempts may be detected using the techniques disclosed herein, whether impersonating an email address or impersonating a domain name.

With the foregoing in mind, it is to be generally understood that this disclosure relates to aspects of consumer electronics (CE) devices and other types of client devices and servers. Thus, devices herein may include server and client components which may be connected over a network such that data may be exchanged between the client and server components. The client components may include one or more computing devices including mobile smart phones, smart watches and other mobile devices, wearable devices, game consoles, extended reality (XR) headsets such as virtual reality (VR) headsets and augmented reality (AR) headsets, display devices such as televisions (e.g., smart TVs, Internet-enabled TVs), personal computers such as laptops, desktop, and tablet computers, and still other types of devices. These client devices may operate with a variety of operating environments. For example, a client device consistent with present principles may employ, as examples, Linux and Unix operating systems, operating systems from Microsoft, or operating systems from Apple or Google. These operating environments may be used to execute one or more browsing programs, such as a browser made by Microsoft, Apple, Google, or Mozilla. The operating environments may also be used to execute other Internet-networked dedicated mobile applications that can access websites hosted by the Internet servers over a network such as the Internet, a local intranet, or a virtual private network.

Servers and/or gateways may be used that may include one or more processors executing instructions that configure the servers to receive and transmit data over a network such as the Internet. Or a client and server can be connected over a local intranet or a virtual private network. A server or controller may be instantiated by a personal computer, mobile device, rack or blade server, etc.

As indicated above, information may be exchanged over a network between client devices and servers. To this end and for security, servers and/or clients can include firewalls, load balancers, temporary storages, and proxies, and other network infrastructure for reliability and security.

As used herein, instructions may refer to computer-implemented steps for processing information in the system. Instructions can be implemented in software, firmware or hardware, or combinations thereof and include any type of programmed steps undertaken by components of the system.

A processor may be any single-or multi-chip processor that can execute logic by means of various lines such as address lines, data lines, and control lines and registers and shift registers. Moreover, any logical blocks, modules, and circuits described below can be implemented or performed with a processor/processor system such as a central processing unit (CPU), a digital signal processor (DSP), a field programmable gate array (FPGA) or other programmable logic device, an application specific integrated circuit (ASIC), discrete gate or transistor logic, discrete hardware components, or any combination thereof designed to perform the functions described herein. A processor can be implemented by a controller or state machine or a combination of computing devices.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

The functions and methods described below, when implemented in software, can be written in an appropriate language such as but not limited to C# or C++, and can be stored on or transmitted from a computer-readable storage medium such as a hard disk drive (HDD) or solid state drive (SSD), random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

In an example, a processor/processor system can access information over its input lines from data storage, such as a computer readable storage medium as referenced above, and/or the processor system can access information wirelessly from an Internet server by activating a wireless transceiver to send and receive data. Data typically is converted from analog signals to digital by circuitry between the antenna and the registers of the processor system when being received and from digital to analog when being transmitted. The processor system then processes the data through its shift registers to output calculated data on output lines, for presentation of the calculated data on the device, etc.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

The term "a" or "an" in reference to an entity refers to one or more of that entity. As such, the terms "a"or "an", "one or more", and "at least one"can be used interchangeably herein.

The term "circuit" or "circuitry" may be used in the summary, description, and/or claims. The term "circuitry" includes all levels of available integration, e.g., from discrete logic circuits to the highest level of circuit integration such as VLSI, and includes programmable logic components programmed to perform the functions of an embodiment as well as processors (e.g., special-purpose processors) programmed with instructions to perform those functions.

Referring now to FIG. 1, an example system 10 is shown, which may include one or more of the example devices mentioned above and described further below in accordance with present principles. The first of the example devices included in the system 10 is a consumer electronics (CE) device 12. The CE device 12 may be a computerized Internet enabled ("smart") phone, a tablet computer, a laptop/notebook computer, a desktop computer, a head-mounted device (HMD) and/or headset such as smart glasses or AR or VR headset, another wearable computerized device, etc. Regardless, it is to be understood that the CE device 12 is configured to undertake present principles (e.g., communicate with other CE devices and servers to undertake present principles, execute the logic described herein, and perform other functions and/or operations described herein).

Accordingly, to undertake such principles the CE device 12 can be established by some, or all, of the components shown. For example, the CE device 12 can include one or more touch-enabled displays 14 that may be implemented by a high definition or ultra-high definition "4K" or higher flat screens. The touch-enabled display(s) 14 may include, for example, a capacitive or resistive touch sensing layer with a grid of electrodes for touch sensing consistent with present principles (e.g., to provide input to the GUIs discussed below).

The CE device 12 may also include an analog audio output port 15 to drive one or more external speakers or headphones, and may include one or more internal speakers 16 for outputting audio in accordance with present principles. The CE device 12 may also include at least one additional input device 18 such as one or more audio receiver/microphones, e.g., for detecting sound and entering audible commands to the CE device 12 to control the CE device 12. The example CE device 12 may also include one or more wired or wireless network interfaces 20 for communication over at least one network 22 such as the Internet, a WAN, a LAN, etc. under control of one or more processors of a processor system 24, such as a CPU or other processor mentioned above. Thus, the interface 20 may be, without limitation, a Wi-Fi transceiver and/or wireless telephony transceiver for communicating over a wireless cellular network (e.g., operated by Verizon, T-Mobile, or AT&T), both of which are examples of a wireless computer network interface. The network interface 20 may also be a wired or wireless modem or router or other suitable network interface.

It is to be understood that the processor system 24 may include one or more processors acting independently or in concert with each other to execute an algorithm, whether those processors are in one device or more than one device. The processor system 24 controls the CE device 12 to undertake present principles, including the other elements of the CE device 12 described herein such as controlling the display 14 to present images thereon and receiving input therefrom.

In addition to the foregoing, the CE device 12 may also include one or more input and/or output ports 26 such as a high-definition multimedia interface (HDMI) port or a universal serial bus (USB) port to physically connect to another CE device, and/or a headphone port to connect headphones to the CE device 12 for presentation of audio from the CE device 12 through the headphones. For example, the input port 26 may be connected wired or wirelessly to a cable or satellite source **26*a* of audio video content. Thus, the source 26*a* may be a separate or integrated set top box, or a satellite receiver. Or the source 26*a*** may be a game console or disk player containing content.

The CE device 12 may further include one or more non-transitory computer memories/computer-readable storage media 28 such as disk-based or solid-state storage that are not transitory signals. In some cases, the media 28 may be embodied in the chassis/housing of the CE device 12 (e.g., as standalone devices) or as removable memory media or the below-described server(s).

Also, in some embodiments, the CE device 12 can include a position or location receiver such as but not limited to a cell phone transceiver, global positioning system (GPS) transceiver, and/or altimeter 30. This transceiver may therefore be configured to receive geographic position information from a satellite or cellphone base station (and/or determine an altitude at which the CE device 12 is disposed) and then provide the information to the processor system 24. However, it is to be understood that another suitable position receiver other than a GPS receiver, cell phone transceiver, and/or altimeter may be used consistent with present principles to determine the location of the CE device 12.

Continuing the description of the CE device 12, in some embodiments the CE device 12 may include one or more cameras 32 that may be thermal imaging cameras, digital cameras such as webcams, infrared (IR) sensors, and/or other types of cameras or other optical sensors integrated into the CE device 12 and controllable by the processor system 24 to gather pictures/images and/or video consistent with present principles. Also included on the CE device 12 may be a Bluetooth® transceiver 34 and/or other Near Field Communication (NFC) element 36 for communication with other devices using respective Bluetooth and/or NFC wireless technologies/communication standards. An example NFC element can be a radio frequency identification (RFID) element.

Further still, the CE device 12 may include one or more auxiliary sensors 38 that provide input to the processor system 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc.

Other sensor examples include a motion sensor such as an accelerometer, gyroscope, magnetometer, a speed and/or cadence sensor, an event-based sensor, a gesture sensor (e.g., for sensing gesture command), etc. In one specific example, the sensor 38 thus may be implemented as an inertial measurement unit (IMU) with motion sensors including individual accelerometers, gyroscopes, and magnetometers, and/or other components of that include a combination of accelerometers, gyroscopes, and magnetometers, to determine the location and orientation of the CE device 12 in three dimensions. A gyroscope consistent with present principles may sense and/or measure the orientation of the CE device 12 and provide related input to the processor system 24, an accelerometer consistent with present principles may sense acceleration and/or movement of the CE device 12 and provide related input to the processor system 24, and a magnetometer consistent with present principles may sense and/or measure directional movement of the CE device 12 and provide related input to the processor 122.

The CE device 12 may also include an over-the-air TV broadcast port 40 for receiving OTA TV broadcasts and providing the input to the processor system 24. In addition to the foregoing, it is noted that the CE device 12 may also include an IR transceiver 42 such as an IR data association (IRDA) device. A battery (not shown) may be provided for powering the CE device 12, as may a kinetic energy harvester that may turn kinetic energy into power to charge the battery and/or power the CE device 12. The CE device 12 may also be powered by an alternating current power supply. A graphics processing unit (GPU) 44 and field programmable gated array 46 also may be included.

One or more haptics/vibration generators 47 may also be provided for generating tactile signals/vibrations that can be sensed by a person holding or in contact with the device. The haptics generators 47 may thus vibrate all or part of the CE device 12 using an electric motor connected to an off-center and/or off-balanced weight via the motor's rotatable shaft so that the shaft may rotate under control of the motor (which in turn may be controlled by a processor such as the processor system 24) to create vibration of various frequencies and/or amplitudes as well as force simulations in various directions.

In addition to the CE device 12, the system 10 may include one or more other CE devices/types, which may include some or all of the components mentioned above in relation to the CE device 12. In one example, a second CE device 48 may be established by an Internet of things (IoT) device, a smartphone, a laptop computer, etc. A third CE device 50 is also shown in FIG. 1 and may include similar components as the other CE devices. Thus, in one example, the CE device 50 may be configured as a head-mounted display (HMD) that may include a heads-up transparent or non-transparent display for respectively presenting extended reality (XR) content such as AR content, VR, content, and/or mixed reality (MR) content. The XR content itself might include, as an example, one or more of the GUIs described below, presented stereoscopically. The HMD may be configured as a glasses-type display, or as goggle-type and/or VR-type display vended by various computer hardware manufacturers such as Apple, Oculus, Meta, etc.

In the example shown, only three CE devices are shown, it being understood that fewer or more devices may be used. A device herein may implement some or all of the components shown for the CE device 12. Any of the components shown in the following figures may incorporate some or all of the components shown in the case of the CE device 12.

Now in reference to the afore-mentioned at least one server 52, it includes at least one server processor/processor system 54 and at least one tangible computer readable storage medium 56 such as disk-based or solid-state storage. The server 52 also includes at least one network interface 58 that, under control of the server processor 54, allows for communication with other illustrated devices over the network 22 (e.g., the Internet), and indeed may facilitate communication between the server 52 and any other servers/client devices as described herein. Note that the network interface 58 may be, e.g., a wired or wireless modem or router, Wi-Fi or Ethernet transceiver, or other appropriate interface such as, e.g., a wireless telephony transceiver.

Accordingly, in some embodiments the server 52 may be an Internet server or an entire server "farm" of multiple services. If desired, the server 52 may include/perform "cloud" functions such that the devices of the system 10 may access a "cloud" environment via the server 52 in certain example embodiments. Additionally or alternatively, the server 52 may be implemented by one or more computers in the same room as the other devices shown, or nearby.

The components shown in the following figures may include some or all components shown herein. Any user interfaces (UI) described herein may be consolidated and/or expanded, and UI elements may be mixed and matched between UIs.

Figure 2:
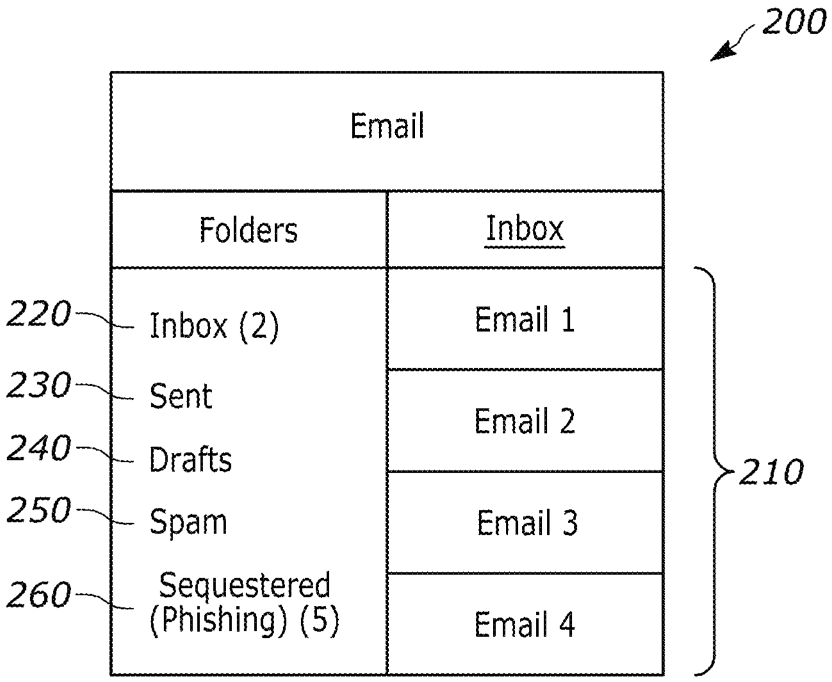
FIG. 2 shows a graphical user interface (GUI) for a user's email inbox, with the GUI also including a selectable link to present a sequestration folder with potential phishing emails that have been filtered out from being included in the inbox itself consistent with present principles.

With the foregoing in mind, reference is now made to FIG. 2. Suppose a user logs in or otherwise accesses his/her email account to view emails sent to the email address that is associated with the account. As such, a graphical user interface (GUI) 200 may be presented on the display of the user's device, with the GUI 200 showing the inbox for the email account. Accordingly, the GUI 200 may include individual emails 210 in the inbox folder.

Additional folder selectors are listed on the left-hand side of the GUI 200, with each folder selector being selectable to provide a command to present emails assigned to the respective folder itself as part of the GUI 200 (e.g., replacing the listing of inbox emails 210 on the right-hand side with a listing of emails from the selected folder). Note that each selector also includes, in parentheses, unread emails in the respective folder. In non-limiting examples, the folder selectors include not just the inbox folder selector 220 but also a sent emails folder selector 230, a draft emails folder selector 240, and a spam emails folder selector 250.

Consistent with present principles, the selectors on the left-hand side may also include a sequestered/phishing emails selector 260. The selector 260 may therefore command the email system to present a listing of emails similar to that shown for the inbox, but with different emails that have been sequestered by the system based on identification of those emails as being potential phishing emails.

In non-limiting examples, phishing itself may refer to attempts to steal or otherwise gain unauthorized access to sensitive user information such as usernames, passwords and other login credentials, social security numbers, a user's contact list, credit card numbers, bank account information, and other important data, which may then be used by or sold to nefarious third parties. Phishing may also include attempts to install malware on a user's device or software systems by enticing the user to select a malicious link, file, or other item included in a phishing email. Indeed, sometimes even the opening of a phishing email can trigger a malicious attack. Phishing might also include duping a user into wiring money to the nefarious actor (e.g., as part of an apparent real estate transaction). Ultimately, phishing can often damage the person to whom the phishing is directed by way of identity theft, account lockouts, malware installation, data harvesting of sensitive information, etc.

Therefore, consistent with present principles, a system may identify potential instances of phishing through emails that are sent to the user's email address. To help the user avoid unintentionally falling for a phishing attack, emails identified as potential phishing emails may be sequestered into the sequestered folder of the email account and only presented responsive to selection of the selector 260 to present the phishing folder itself. This may help the user avoid unintentionally opening an email or clicking on a link or other malicious object in the email itself, helping to avoid the potential phishing instance yet still giving the user the chance to see the email (should it have been mistakenly classified as a potential phishing instance).

Additionally, as an added security measure, the phishing folder may be sandboxed/isolated from the rest of the email account such that access to other folders in the email account is not permitted from the phishing folder responsive to selection of a phishing email in the phishing folder (and/or responsive to selection of an element in a phishing email in the phishing folder, such as a link in the email or attachment to the email). For example, an additional password or access code may be required to be entered once in the phishing folder to return to other areas of the email account so that any actual phishing triggered through selections in the folder does not trigger the system, email account, third party application, malicious software code, etc. loaded or instigated through the phishing email to then access other parts of the email account itself (or even the user's personal device at large, which might otherwise happen transparently to the end-user without his/her knowledge). The additional password or access code may be different from a login password used to access the email account itself at login and may be specific to exiting the phishing folder. Thus, this technique may help avoid phishing instances where the malicious software code tries to access other parts of the user's email account, a password storage area of the user's browser or operating system, cloud storage, encrypted solid state drive storage, etc.

Figure 3:
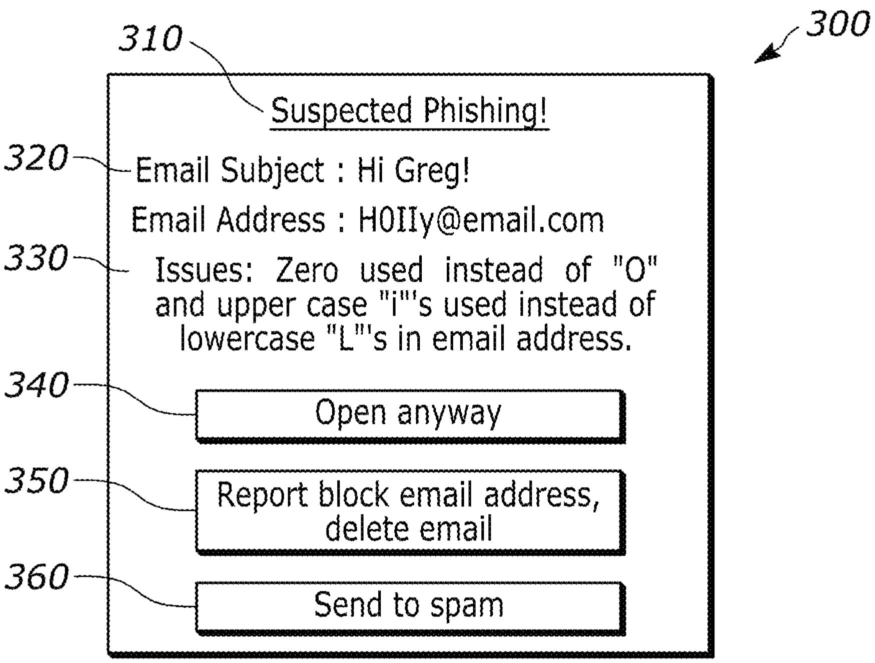
FIG. 3 shows an example GUI with a notification indicating that a particular email might be phishing consistent with present principles.

FIG. 3 shows another example technique for helping the user avoid a potential phishing instance, this time through presentation of a visual notification 300 on the display of the user's device. The technique of FIG. 3 may be used alone, or may be used in combination with other techniques disclosed herein for even greater digital security. The notification 300 may be presented responsive to receipt of the associated (potential) phishing email itself and identification of it as such, responsive to login to the user's email account, responsive to a command to open the (potential) phishing email but before the system actually opens it, and/or responsive to another trigger.

As shown in FIG. 3, the notification 300 may establish a GUI with a prompt 310 indicating that email itself has been identified as a potential phishing email. The notification 300 may also indicate certain identifying information about the email for the user to decide if the user wants to open the email anyway. As such, respective indications 320 are presented of the subject of the email and the sender of the email (as identified via email address here, though the first and last name of the sender may also be presented).

In some instances, the notification 300 may also include an indication 330 specifying the reasons the email has been identified as a potential phishing email. In the present instance, the indication 330 indicates that the number zero was used instead of an uppercase alphabetic character ("O"), and that uppercase alphabetic characters for "I" have been used instead of lowercase "L"s, in the email address of the sender.

Then, if the user decides to open the email anyway, the user may select the selector 340 to provide a command to open the email. However, if the user does in fact believe based on the indication 330 that the email is a potential phishing attack, the user may instead select either of the selectors 350, 360.

The selector 350 may be selected to command the system to report the email to the email service provider as a phishing email. In addition to or in lieu of that, selection of the selector 350 may provide a command to the email system to block the email address at the user's email account so that additional emails from the same address are blocked, not received, and/or auto-deleted from the email account so that the user would not see them in the account or have a chance to open/interact with subsequent emails from the same email address. Also in addition to or in lieu of that, selection of the selector 350 may command the system to delete the current email to which the prompt 310 and indications 320, 330 pertain. Here, deleting may include moving to a trash folder that gets automatically emptied at regular time intervals, or may even include deleting the email entirely so that it is no longer in the email account and cannot be accessed through the trash folder (for even greater digital security).

The selector 360 might also be selected by the user. The selector 360 may be selected to command the email system to send the current email to a spam folder instead. The email might then be accessed at a later time by the user via the spam folder. Note that in addition to selection of the selector 360 to send the email to the spam folder, selection of the selector 360 might also create a spam filtering rule for the user's email account so that any subsequent emails received from the same sender/email address are automatically sent to the spam folder (and do not appear in the inbox and/or other areas/folders of the user's email account).

Figure 4:
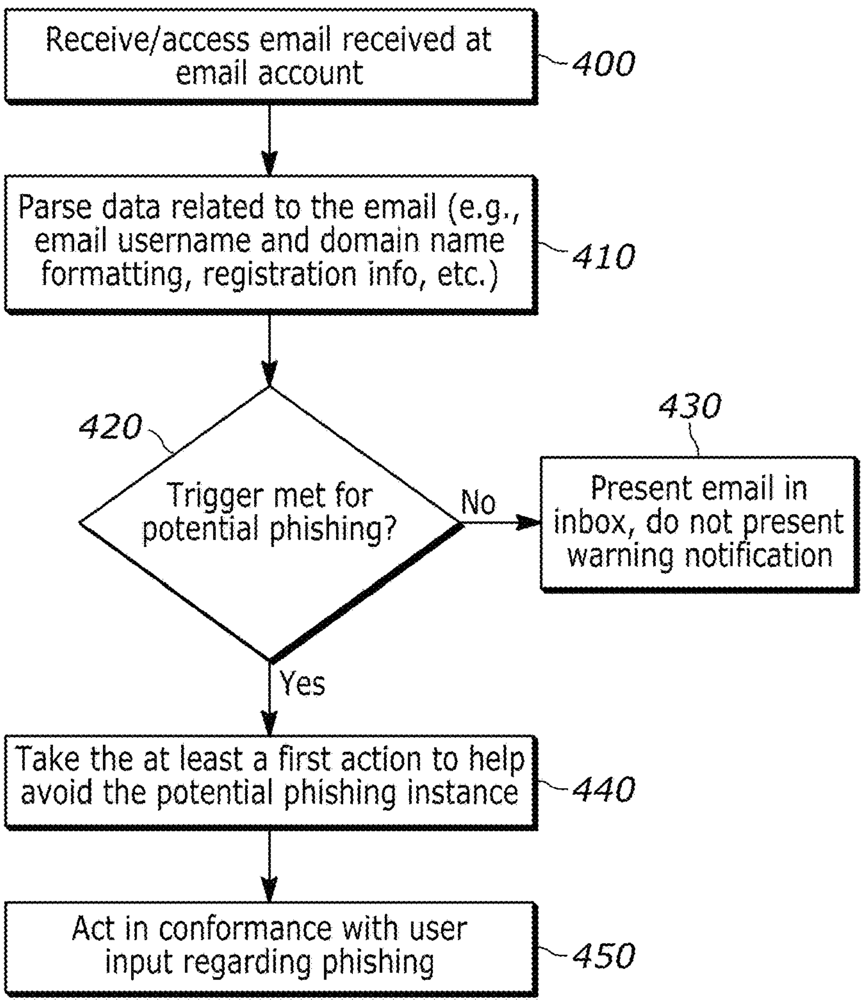
FIG. 4 illustrates example logic in example flow chart format that may be executed by an apparatus/processor system consistent with present principles.

Before moving on to the description of FIG. 4, note that other types of notifications may be presented in addition to or in lieu of a visual notification as shown in FIG. 3. For example, an audible notification may be presented in the form of an audible tone. As another audible notification example, a computer-generated voice such as a digital assistant voice may read aloud the prompt 310 and indications 320, 330 over a speaker of the user's device. Tactile notifications may also be presented by vibrating the user's device using a vibrator in the device responsive to the email being received and determined as potential phishing, responsive to login to the user's email account, responsive to a command to open the (potential) phishing email but before the system actually opens it, and/or responsive to another trigger.

Now in reference to FIG. 4, this figure shows example logic that may be executed by an apparatus such as the CE device 12, a client device (such as a user's laptop or smartphone), and/or an email server alone or in any appropriate combination consistent with present principles. Thus, in some examples the logic may be executed by a client device alone. In other examples, the logic may be executed by the remotely-located email hosting server alone. In still other examples, the logic may be executed by a client device and remotely-located server, where the client device performs some steps while the server performs other steps, and/or where the client device and server work together to perform a given step. Thus, in various examples, the logic may be executed by the user's email client (e.g., app used to access the email account), by a software extension to the user's existing email client, and/or the email system itself as hosted at a cloud server. Further note that while the logic of FIG. 4 is shown in flow chart format, other suitable logic may also be used.

Beginning at block 400, the apparatus may receive or otherwise access an email received at a recipient email account. The logic may then proceed to block 410 where the apparatus may parse/analyze data related to the email, such as the email address from which the email was sent (e.g., to identify email username and email domain name sections with strange formatting), the body of the email itself (e.g., to identify potentially malicious links), the registration information for the domain name of the associated email address, etc. From block 410 the logic may then proceed to decision diamond 420 where, based on the parsing/analysis, the apparatus may determine whether one or more triggers have been met for identifying a potential instance of phishing and, hence, determine whether to take at least one action to help avoid the potential phishing instance.

Accordingly, in various non-limiting examples, one or more of the following determinations may be made. Additionally, in some cases more than one of these determinations may be made in a given instance to increase device confidence in identifying a potential phishing instance. Further note that rules-based software for making such determinations may be configured by the email system provider/host, a third party email application ("app") developer, or other entity so that certain suspicious patterns that are indicators of potential phishing may be implemented in the rules-based system.

Accordingly, in a first example, the determination whether to take at least one action to help avoid a potential phishing instance may be based on whether the email address from which the received email was sent includes a numeric character between two alphabetic characters. Such an example was discussed above in reference to FIG. 3, where the number zero was used instead of an uppercase alphabetic character ("O"), since those two characters can look visually identical in certain instances and hence the user would have no way of knowing a phishing email address was being used.

In a second example, the determination whether to take at least one action to help avoid a potential phishing instance may be based on whether the email address includes a numeric character at a first location in a character string of the email address that includes two or more alphabetic characters (the character string including the username portion of the address before the "@" symbol and/or the domain name portion of the address after the "@" symbol). The first location may be a location other than one or more end locations of the username of the email address, where the end locations of the user name may be established by characters following all alphabetic characters of the email username but still preceding the "@" symbol. So here, the one or more end locations may still include respective numeric characters that follow all alphabetical characters of the username since, in some cases, a non-phishing email might be sent from a benign email address with numeric characters at the end of the username portion of the email address (e.g., john12@email.com). But still, the first location itself may be another username location or a domain name location for the email address. In fact, numeric characters in the domain name of the email address may be particularly suspect.

However, also in some instances, the determination whether to take at least one action to help avoid a potential phishing instance may be based on whether the email address includes a numeric character specifically at the end locations of the email address' username, where the end locations correspond to the last/final characters of the username after all alphabetical characters of the username (e.g., but still before the "@" symbol).

In yet another example, the determination whether to take at least one action to help avoid a potential phishing instance may be based on whether the email address includes an uppercase letter between two lowercase letters, and/or whether the email address includes a lowercase letter between two uppercase letters. Both of these triggers can be strong indicators of a potential phishing email where the sender tries to make a phishing email address look like a similar, legitimate email address with which the user is already familiar. Such an example was discussed above in reference to FIG. 3, where uppercase alphabetic characters for "I" were used instead of lowercase "L"s since those two characters can look visually identical in certain instances and hence the user would have no way of knowing themselves.

As still another example, the determination whether to take at least one action to help avoid a potential phishing instance may be based on whether the email address includes characters from two different scripts. In one particular non-limiting instance, the scripts may be the Latin script and the Cyrillic script. Thus, while the Latin script (sometimes referred to as the Roman script) might be used for email addresses in many countries, certain Cyrillic characters can look virtually identical to certain Latin characters but still constitute a separately-registrable email address from which phishing emails can be sent since the email addresses themselves (phishing and legitimate) are still different owing to different script/character use. Other example scripts consistent with present principles include the Glagolitic script, the Armenian alphabet, the Georgian script, the Coptic alphabet, and/or the Runes script.

Still in reference to diamond 420 and as another example, the determination whether to take at least one action to help avoid a potential phishing instance may be based on whether the email address includes a non-alphanumeric character, such as a period ("."), dash ("-"), underscore ("_"), asterisk ("*"), question mark ("?"), or exclamation mark ("!"). These types of characters might be used to create a phishing email address that is similar to a legitimate, non-nefarious email address with which the user is already familiar but with minor punctuation/character changes to trick the user into thinking the phishing email address is the non-nefarious email address (either the same one with which the user is already familiar or a similar one where the user might incorrectly assume that a legitimate user has changed benign email addresses).

Thus, in one particular instance, the email address from which the potential phishing email was sent might include a non-alphanumeric character between two alphanumeric characters to trick the user into opening the email. For instance, the legitimate email address might be "davemartinez@email.com" and the phishing email address might be "dave-martinez@email.com" or "dave.martinez@email.com".

To establish another example trigger for diamond 420, the analyzing of the data related to the email might include validating the domain name of the email address to determine whether to take at least one action to help avoid a potential phishing instance. The validation may include validating that the domain name has a natural person listed in a domain name registry (e.g., domain name service or registration entity) as a point of contact. This might be in contrast to a business entity name itself being listed as the point of contact, which can be suspicious since many legitimate businesses list a human point of contact when registering a domain name for website and email purposes while nefarious actors do not.

Additionally or alternatively, the validation may include validating that the registration information for the email domain indicates certain contact information that might be required in certain non-limiting examples (such as phone number and physical street address), since many phishers do not provide such information when registering a nefarious email domain.

As another example for validation that may be used in addition to or in lieu of the foregoing, validation may include validating that a two-factor authentication email address indicated in the registration information (different from the potential phishing email address) is valid. This may be done by sending an authentication code test email or even blank test email to the two-factor authentication email address listed for the same account as the registered (potential phishing) email address to determine if the test email is rejected as undeliverable through an undeliverable return email that might be received in response to sending the test email (indicating that the other email tied to the same registration info is a potential phishing email address since the backup email address for the two-factor authentication per the registration information is not legitimate).

Additionally or alternatively, the validation may include validating that an email service/website through which the domain name was registered has itself not been blacklisted. The blacklisting may have been done based on the understanding that certain email registration services might not require a sufficient level of information about email registrants under the guise of preserving privacy and anonymity. Therefore, those services may themselves be blacklisted consistent with present principles to thus flag/block emails with addresses registered through the blacklisted source from reaching the user, which may be more effective than blacklisting individual email addresses and individual domain names that can be easily created and then dumped.

Thus, responsive to the domain name not being validated according to one or more of the techniques above, the apparatus may determine to take at least one action to help avoid a potential phishing instance.

Still in terms of the decision at diamond 420, note that other triggers as also discussed herein may also be used to determine a potential phishing. Furthermore, in some cases a potential phishing instance identified according to the examples above may still be determined as not an actual phishing instance based on the apparatus also determining that the potentially suspicious email address is associated with a previously-sent (different) email from the user's own email account to the potentially suspicious email address, and/or based on the apparatus also determining that the potentially suspicious email address is listed or otherwise indicated in a contacts list associated with the user's email account. This can help avoid false positives where an email address for an incoming email might satisfy one of the phishing rules set forth above but still be a legitimate email, such as if a first name and last name of a user is indicated in the username portion of the email address but separated by a period (".").

A negative determination at diamond 420 (no potential phishing instance) may cause the logic to proceed to block 430 where the apparatus may present the relevant email in the email account's inbox and decline to present a warning notification such as the one discussed above in reference to FIG. 3. However, responsive to an affirmative determination at diamond 420 (potential phishing instance detected), the logic may instead proceed to block 440.

At block 440 the apparatus may take one or more actions to help avoid the potential instance of phishing, including the actions discussed above in relation to FIGS. 2 and 3 (e.g., sequestering the email into a phishing email folder and/or presenting one or more phishing-related notifications). Then at block 450 the apparatus may act in conformance with any user input received regarding the phishing instance, such as executing any of the functions described above regarding the selectors 340-360.

Figure 5:
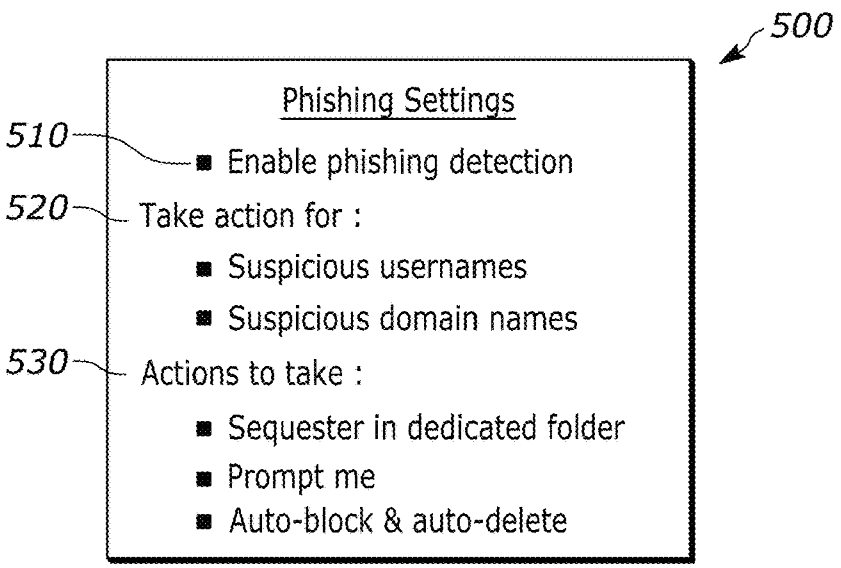
FIG. 5 shows an example settings GUI that may be presented on a display to configure one or more settings of an application and/or apparatus to operate consistent with present principles.

Now in reference to FIG. 5, this figure shows an example GUI 500 that may be presented on a display for an end-user to configure one or more settings of an apparatus/email account to operate consistent with present principles. The GUI 500 may therefore be presented to opt-in to email scanning for potential instances of phishing. Also note that each option discussed below may be selected by selecting the respective check box shown adjacent to that option, whether through cursor input, touch input, or another type of input.

As shown in FIG. 5, the GUI 500 may include a first option 510 that is selectable via a single input to command the apparatus to, for multiple future incoming emails, undertake the functions described herein (including those described above in reference to FIGS. 2-4). The GUI 500 may also include respective options 520 that are selectable for the user to select various particular aspects of an email address to parse/analyze consistent with the logic of FIG. 4, including an option to inspect the username portion and an option to inspect the domain name portion, if the user does not want the entire email address parsed for some reason (e.g., the user often receives emails from email accounts of a legitimate domain name that includes numerical characters in the domain name).

The GUI 500 may also include respective options 530 for the user to select various different actions for the apparatus to take responsive to identifying a potential instance of phishing. As shown, those actions include sequestering the potential phishing emails into a dedicated phishing folder and prompting the user as both described above.

Another example option 530 is also shown which may be selectable to command the apparatus to autonomously block and/or autonomously delete potential phishing emails from the user's email account when detected without even presenting them to the user in a phishing folder or presenting notifications to the user about them. This option may therefore enforce a relatively stricter security policy, which may be beneficial for particularly important, high-security email accounts.

Moving on from FIG. 5, note that present principles may apply to other electronic messages besides emails as well. For instance, an email address might send an email to a phone number using a short messaging service (SMS) gateway to the user's smartphone, and so SMS text messages and multimedia messaging service (MMS) messages might also be analyzed based on the source email address from which the SMS/MMS message was sent.

Now describing other implementations that may be used consistent with present principles, an apparatus might parse an email address using spellcheck software to determine if an email from that email address might be potential phishing. Thus, when spellcheck runs on the email address and returns a spelling error for a word in the email address or punctuation error in the email address, the apparatus may determine that the associated email itself might be potential phishing. As one specific example, suppose a legitimate email address is "helpdesk@email.com" but that a phishing email is received from an email address that replaces the lowercase "L" in that email address with an uppercase "I". Running spellcheck on the phishing email address would return an incorrect spelling for the word "help" and therefore the associated email may be flagged for potential phishing. Human names may also be checked using spellcheck so that "Oliver" as located in an email address would not return a result for potential phishing while "0liver" with a zero instead of an alphabetic "O" would return a result for potential phishing. Different scripts as set forth above might also be flagged using spellcheck.

In addition to or in lieu of spellcheck, a similar parsing of the email address may be done using other artificial intelligence-based software as well, including natural language processing algorithms. Those algorithms may also be used to identify, in email addresses, incorrect spellings even for proper nouns as well as to identify out-of-place numerical characters in the middle of a word/name otherwise established by all alphabetic characters.

Also note that top-level domain (TLD) portions of email address domain name sections may also be parsed consistent with present principles. For instance, a user might regularly receive emails from an email address ending in ".com" and hence emails from that email address may not be flagged for potential phishing. But when an email is received from another email address that is the same except for ending in ".net" or ".org" and the user has not previously sent an email to that address (and that address is not entered into the user's contact list), the email from that email address may be determined to be a potential instance of phishing.

Still further, as another example the system may parse the user's contacts and previously-sent emails to determine if a username portion of an email address that sent a recently-received email is the same as the one in the sent folder/contacts list, but with the domain names for the two email addresses being different. For example, the user might have previously sent an email to an email address "steve@IT.com" for an information technology business but then received a potential phishing email from "steve@IThelpdesk.com". Thus, responsive to the domain name portion being different, a potential instance of phishing may be determined.

As yet another example, an action to determine whether an email address is being used for phishing may include sending a test email to the email address before opening the received email from the same address. If the test email is returned as undeliverable (e.g., through an auto-reply undeliverable email sent back in response), the received email from the same email address may be classified as a potential phishing attempt.

Also to validate an email address of a received email that might be a phishing attempt (also before opening the received email itself), the system may check social media platforms such as Facebook and X to see if the email address is associated with an actual profile/contact information for a user of the social media service. If it is not, then the received email may be classified as a potential phishing attempt.

As another example, an email address for a received email may exhibit certain pre-designated characters (e.g., lowercase "L" or zero) so that when the system identifies those characters from an email address, the system can replace the pre-designated character with another predetermined character that the system admin has specified as similar in the email programming code itself (e.g., uppercase "I" or uppercase letter "O", respectively). The system can then check the variant email address (with the replacement character) to determine if the replacement address matches an email address in the user's email account contact list and/or the address of an email previously sent from the user's email account. If the variant email address returns a match, then the unaltered email address for the received mail itself may be flagged as suspicious (and hence so may the received email itself).

As another example, the system can check for phishing/spoofing by checking to see if a potential phishing email address uses an International Domain Name with a different country code than an email address in the user's contact list or sent mail folder. (e.g., ".au" for Australia or ".uk" for the United Kingdom). Checks can also be performed to determine if an otherwise legitimate email address is missing a letter from an actual, verified domain name to infer a phishing attempt. Capitalization of an email address may also be inspected and compared against known legitimate email addresses since sometimes capitalization of one or more letters can alone result in a different (phishing) email address being registered even if the email addresses are the same apart from the differing capitalizations.

As but one more example, Unicode variants beyond the Latin alphabet may also be inspected to infer a phishing attempt if those variants are used in the email address. For example, the phishing email address might employ full-width characters rather than standard characters, and/or might use ligatures rather than standard characters (e.g., ligatures being special characters that combine two or more letters into a single glyph, such as using the "fl" ligature instead of the letters "f" and "l" as independent, sequential characters).

Before concluding, it is to be understood that although a software application for undertaking present principles may be vended with a device, present principles apply in instances where such an application is downloaded from a server to a device over a network such as the Internet. Furthermore, present principles apply in instances where such an application is included on a computer readable storage medium that is vended and/or provided by itself, where the computer readable storage medium is not a transitory signal and/or a signal per se.

It may now be appreciated that present principles provide, among other technical improvements, improved computer-based user interfaces that increase the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein.

What is claimed is:

1. An apparatus, comprising:

a processor system; and at least one computer readable storage medium (CRSM) that is not a transitory signal, the at least one CRSM comprising instructions executable by a processor system to:

access an email received at a recipient email account;

parse data related to the email;

based on the parsing of the data, determine whether to take at least one action to help avoid a potential phishing instance; and based on a determination to take at least one action to help avoid the potential phishing instance, take at least a first action to help avoid the potential phishing instance;

wherein the first action comprises sequestering the email into a first folder different from an inbox of the recipient email account, the first folder being isolated from the rest of the recipient email account such that access to other folders in the recipient email account is not permitted from the first folder responsive to selection of the email as located in the first folder and/or responsive to selection of an element in the email as located in the first folder; and wherein an additional password and/or access code are required once in the first folder to return to the other areas of the recipient email account.

2. The apparatus of claim 1, wherein the additional password and/or access code are different from a login password usable to access the recipient email account.

3. The apparatus of claim 2, wherein the additional password and/or access code are specific to exiting the first folder.

4. The apparatus of claim 1, wherein the determination is based at least in part on whether the email address is associated with a sent email from the recipient email account to the email address.

5. The apparatus of claim 1, wherein the instructions are executable to:

validate a domain name associated with the email to make the determination, the validation comprising one or more of: validating that the domain name has a natural person listed in a domain name registry as a point of contact, validating that a service through which the domain name was registered has not been blacklisted; and responsive to the domain name not being validated, take at least one action to help avoid a potential phishing instance.

6. The apparatus of claim 1, comprising the processor system.

7. A method, comprising:

accessing an email received at a recipient email account;

parsing data related to the email;

based on the parsing of the data, determining whether to take at least one action to help avoid a potential phishing instance; and based on determining to take at least one action to help avoid the potential phishing instance, taking at least a first action to help avoid the potential phishing instance, wherein the first action comprises sequestering the email into a first folder different from an inbox of the recipient email account, the first folder being isolated from the rest of the recipient email account such that access to other folders in the recipient email account is not permitted from the first folder responsive to selection of the email as located in the first folder and/or responsive to selection of an element in the email as located in the first folder; and wherein an additional password and/or access code are required once in the first folder to return to the other areas of the recipient email account.

8. The method of claim 7, wherein the first folder is isolated from the rest of the recipient email account such that access to other folders in the recipient email account is not permitted from the first folder responsive to selection of the element in the email as located in the first folder.

9. The method of claim 8, wherein the element comprises one or more of: a link in the email, an attachment to the email.

10. The method of claim 7, wherein the additional password and/or access code are specific to exiting the first folder.

11. The method of claim 7, comprising:

validating a domain name associated with the email to make the determination, the validation comprising one or more of: validating that the domain name has a natural person listed in a domain name registry as a point of contact, validating that a service through which the domain name was registered has not been blacklisted; and responsive to the domain name not being validated, taking at least one action to help avoid a potential phishing instance.

12. The method of claim 7, wherein the determining is based at least in part on whether the email address is associated with a sent email from the recipient email account to the email address.

13. An apparatus, comprising:

at least one computer readable storage medium (CRSM) that is not a transitory signal, the at least one CRSM comprising instructions executable by a processor system to:

access an electronic message received at a recipient electronic message account;

analyze data related to the electronic message;

based on the analyzing of the data, determine whether to take at least one action to help avoid a potential phishing instance; and based on a determination to take at least one action to help avoid the potential phishing instance, take at least a first action to help avoid the potential phishing instance;

wherein the first action comprises sequestering the electronic message into a first folder different from an inbox of the recipient electronic message account, the first folder being isolated from the rest of a user's device at which the recipient electronic message account is accessible such that access to other areas of the user's device is not permitted from the first folder responsive to selection of the electronic message as located in the first folder and/or responsive to selection of an element in the electronic message as located in the first folder; and wherein an additional password and/or access code are required once in the first folder to return to the other areas of the user's device.

14. The apparatus of claim 13, wherein the first folder is isolated from a cloud storage area accessible via the user's device such that access to the cloud storage area is not permitted from the first folder responsive to selection of the electronic message as located in the first folder and/or responsive to selection of the element in the electronic message as located in the first folder.

15. The apparatus of claim 13, wherein the other areas of the user's device comprise one or more of: a password storage area of a browser, a password storage area of an operating system, an encrypted storage drive.

16. The apparatus of claim 13, wherein the determination is based at least in part on whether an email address used for the electronic message is associated with a sent email from the recipient electronic message account to the email address.

17. The apparatus of claim 13, wherein the instructions are executable to:

validate a domain name associated with the electronic message to determine whether to take at least one action to help avoid a potential phishing instance, the validation comprising one or more of:

validating that the domain name has a natural person listed in a domain name registry as a point of contact, validating that a service through which the domain name was registered has not been blacklisted; and responsive to the domain name not being validated, determine to take at least one action to help avoid a potential phishing instance.

18. The apparatus of claim 13, wherein the additional password and/or access code are different from a login password usable to access the recipient electronic message account.

19. The apparatus of claim 18, wherein the additional password and/or access code are specific to exiting the first folder.

20. The apparatus of claim 13, comprising the processor system.

* * * * *